United States Patent
Bai (10) Patent No.: US 9,215,699 B2
(45) Date of Patent: Dec. 15, 2015

(54) METHOD FOR CONFIGURING SUBFRAME, METHOD FOR PROCESSING DATA, BASE STATION AND USER EQUIPMENT

(71) Applicant: Huawei Technologies Co., Ltd., Shenzhen (CN)

(72) Inventor: Wei Bai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 14/015,428

(22) Filed: Aug. 30, 2013

(65) Prior Publication Data

US 2013/0343336 A1 Dec. 26, 2013

Related U.S. Application Data

(63) Continuation of application No. PCT/CN2012/071769, filed on Feb. 29, 2012.

(30) Foreign Application Priority Data

Mar. 1, 2011 (CN) .......................... 2011 1 0049560

(51) Int. Cl.
*H04W 72/04* (2009.01)
*H04W 72/08* (2009.01)
*H04W 28/04* (2009.01)
*H04L 1/00* (2006.01)
*H04L 1/18* (2006.01)
*H04W 72/12* (2009.01)

(52) U.S. Cl.
CPC ......... *H04W 72/0406* (2013.01); *H04L 1/0086* (2013.01); *H04L 1/1822* (2013.01); *H04L 1/1825* (2013.01); *H04L 1/1887* (2013.01); *H04W 28/044* (2013.01); *H04W 72/082* (2013.01); *H04L 1/1812* (2013.01); *H04W 72/1278* (2013.01)

(58) Field of Classification Search
CPC ......................... H04W 72/0406; H04L 1/1825
See application file for complete search history.

(56) References Cited

U.S. PATENT DOCUMENTS

| | | | |
|---|---|---|---|
| 2006/0077912 A1* | 4/2006 | Cheng | ............................ 370/265 |
| 2007/0297375 A1 | 12/2007 | Bonta et al. | |
| 2009/0252077 A1 | 10/2009 | Khandekar et al. | |
| 2010/0074153 A1* | 3/2010 | Torsner et al. | ................ 370/280 |
| 2010/0075592 A1 | 3/2010 | Kim et al. | |
| 2011/0086652 A1* | 4/2011 | So et al. | ........................ 455/501 |
| 2011/0149813 A1* | 6/2011 | Parkvall et al. | ............... 370/280 |

(Continued)

FOREIGN PATENT DOCUMENTS

| | | |
|---|---|---|
| CN | 1784068 A | 6/2006 |
| CN | 101882985 A | 11/2010 |

(Continued)

*Primary Examiner* — Jason Mattis
(74) *Attorney, Agent, or Firm* — Brinks Gilson & Lione (57) ABSTRACT

Embodiments of the present invention provide a method for configuring a subframe, a method for processing data, a base station and a user equipment, wherein, the method for configuring a subframe includes: a first base station determines a first subframe to be configured according to priority information of the subframe; the first base station configures an operating mode of the first subframe according to the operating mode of a second subframe, corresponding to the first subframe, of a second base station, such that the operating mode of the first subframe is not subjected to collision with the operating mode of the second subframe.

16 Claims, 3 Drawing Sheets

(56) References Cited

U.S. PATENT DOCUMENTS

2011/0176461 A1* 7/2011 Astely .................. H04B 7/2656
370/280
2011/0211503 A1* 9/2011 Che ....................... H04L 5/0005
370/280
2013/0223258 A1* 8/2013 Seo ....................... H04W 24/02
370/252

FOREIGN PATENT DOCUMENTS

EP 1557967 A1 7/2005
WO WO 2009/120934 A1 10/2009

* cited by examiner

METHOD FOR CONFIGURING SUBFRAME, METHOD FOR PROCESSING DATA, BASE STATION AND USER EQUIPMENT

CROSS-REFERENCE TO RELATED APPLICATIONS

This application is a continuation of International Application No. PCT/CN2012/071769, filed on Feb. 29, 2012, which claims priority to Chinese Patent Application No. 201110049560.2, filed on Mar. 1, 2011, both of which are hereby incorporated by reference in their entireties.

TECHNICAL FIELD

Embodiments of the present invention relate to communication technologies and, in particular to, a method for configuring a subframe, a method for processing data, a base station, and a user equipment.

BACKGROUND

The long term evolved (Long Term Evolved, LTE) system of the 3rd Generation Partnership Project (3rd Generation Partnership Project, 3GPP) can include a frequency division duplexing (Frequency Division Duplexing, FDD) system and a time division duplexing (Time Division Duplexing, TDD) system. In a TDD system, a base station can configure one or more subframes of each frame to be a flexible (F) subframe, the flexible (F) subframe can be specifically configured as an uplink (U) subframe to send uplink information, or as a downlink subframe (D) to send downlink information, or as a blank (B) subframe not in use temporarily, also can be configured as an approximately (A) blank subframe to send only downlink public information.

However, when configuring the subframe, the base station may be affected by uplink or downlink interference from an adjacent base station, for example: when the flexible subframe of the base station is configured as a U subframe, the subframe of the adjacent base station is correspondingly configured as a D subframe, and then the base station will be affected by downlink interference of the adjacent base station, or when the flexible subframe of the base station is configured as a U subframe, the subframe of the adjacent base station is correspondingly configured as a U subframe, and then the base station will be affected by uplink interference of the adjacent base station, or when the flexible subframe of the base station is configured as a D subframe, the subframe of the adjacent base station is correspondingly configured as a U subframe, and then the base station will be affected by uplink interference of the adjacent base station, or when the flexible subframe of the base station is configured as a D subframe, the subframe of the adjacent base station is correspondingly configured as a D subframe, and then the base station will be affected by downlink interference of the adjacent base station. If the interference is so strong that the information transmission of the base station is affected, which means collision occurs, resulting in a decreased quality of air interface signals.

SUMMARY

Embodiments of the present invention provide a method for configuring a subframe, a method for processing data, a base station and a user equipment, so as to avoid strong interference of an adjacent base station, and increase quality of air interface signals.

Embodiments of the present invention provide a method for configuring a subframe, comprising:

determining, by a first base station, a first subframe to be configured according to the priority information of the subframe;

configuring, by the first base station, an operating mode of the first subframe according to an operating mode of a second subframe, corresponding to the first subframe, of a second base station, such that the operating mode of the first subframe is not subjected to collision with the operating mode of the second subframe.

Embodiments of the present invention provide a method for processing data, comprising:

communicating, by a first user equipment, with a first base station through a first subframe; the first subframe is a subframe to be configured, determined by the first base station according to priority information of the frame; the operating mode of the first subframe is configured, by the first base station, according to an operating mode of a second subframe, corresponding to the first subframe, of a second base station, such that the operating mode of the first subframe is not subjected to collision with the operating mode of the second subframe;

after the configuring, by the second base station, the operating mode of the second subframe, if the operating mode of the first subframe is subjected to collision with the operating mode of the second subframe, then stopping, by the first user equipment, an uplink HARQ process corresponding to the first subframe, and sending an unsuccessfully transmitted data packet in a buffer to the first base station using an uplink HARQ process corresponding to another subframe of the first base station.

Embodiments of the present invention further provide a base station, comprising:

a determining module, configured to determine a first subframe to be configured according to the priority information of the subframe;

a configuring module, adapted to configure an operating mode of the first subframe according to an operating mode of a second subframe, corresponding to the first subframe, of an adjacent base station, determined by the determining module and configure the operating mode of the first subframe, such that the operating mode of the first subframe is not subjected to collision with the operating mode of the second subframe.

Embodiments of the present invention further provide a user equipment, comprising:

a communication module, configured to communicate with a first base station through a first subframe; the first subframe is a subframe to be configured determined by the base station according to the priority information of the frame; the operating mode of the first subframe is configured, by the first base station, according to an operating mode of a second subframe, corresponding to the first subframe, of a second base station, such that the operating mode of the first subframe is not subjected to collision with the operating mode of the second subframe;

a processing module, configured, after the configuring, by the second base station, the operating mode of the second subframe, if the operating mode of the first subframe is subjected to collision with the operating mode of the second subframe, to stop an uplink HARQ process corresponding to the first subframe, and to send an unsuccessfully transmitted data packet in a buffer to the first base station using an uplink HARQ process corresponding to another subframe of the first base station.

It can be seen from the above technical solutions that, in embodiments of the present invention, after determining a first subframe to be configured according to the priority information of the subframe, a first base station configures the operating mode of the first subframe according to the operating mode of a second subframe, corresponding to the first subframe, of a second base station, as the operating mode configured for the first subframe of the first base station is not subjected to collision with the operating mode of the second subframe of the second base station, strong interference to the first base station from the second base station can be avoided, thus increasing quality of air interface signals.

BRIEF DESCRIPTION OF THE DRAWINGS

To make the technical solutions of embodiments of the present invention or the prior art more clearly, the accompanying drawings used for describing embodiments or the prior art are briefly described hereunder. Apparently, the accompanying drawings in the following descriptions illustrate only some embodiments of the present invention, and persons skilled in the art can derive other drawings from these drawings without any creative effort.

DESCRIPTION OF EMBODIMENTS

In order to make the purposes, technical solutions and advantages of embodiments of the present invention more clear, the technical solutions of embodiments of the present invention are hereinafter described clearly and comprehensively with reference to the accompanying drawings of embodiments of the present invention. Obviously, the described embodiments are only a part of embodiments of the present invention, rather than all embodiments of the present invention. Based on embodiments of the present invention, all other embodiments derived by persons skilled in the art without any creative effort should fall within the protection scope of the present invention.

Figure 1:
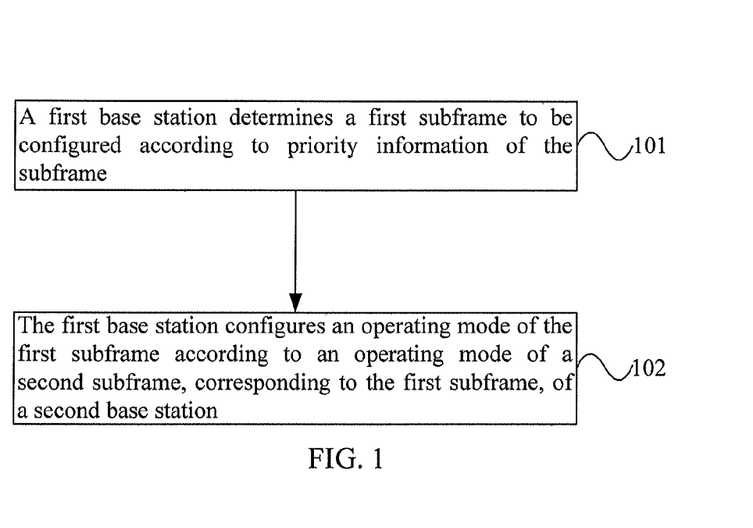
FIG. 1 is a schematic flow diagram of a method for configuring a subframe provided by Embodiment 1 of the present invention.

FIG. 1 is a schematic flow diagram of a method for configuring a subframe provided by Embodiment 1 of the present invention, as shown in FIG. 1, the method for configuring a subframe can include the following steps:

Step 101, a first base station determines a first subframe to be configured according to priority information of the subframe;

Step 102, the first base station configures an operating mode of the first subframe according to an operating mode of a second subframe, corresponding to the first subframe, of a second base station, such that the operating mode of the first subframe is not subjected to collision with the operating mode of the second subframe.

In the scenario of embodiments of the present invention, discussion is made by taking the first base station serving a first user equipment, the second base station serving a second user equipment as an example.

The second base station is an adjacent base station of the first base station, the adjacent base station is a base station which is near the first base station in distance and generates strong signal interference to the first base station. Specifically, generating strong signal interference as discussed above can refer to: a ratio of X1 to Y1 is smaller than a pre-set fifth threshold, where X1 represents the intensity of a signal of the first user equipment received by the first base station, Y1 represents a sum of the intensity of a signal of the second base station received by the first base station and the intensity of a signal of the second user equipment received by the second base station; a ratio of X2 to Y2 is smaller than a pre-set sixth threshold, where X2 represents the intensity of a signal of the first base station received by the first user equipment, Y1 represents a sum of the intensity of a signal of the second base station received by the first user equipment and the intensity of a signal of the second user equipment received by the first user equipment.

The operating mode of the first subframe or the second subframe can include at least one of an uplink transmission mode, a downlink transmission mode, a blank mode and an approximately blank mode.

In step 102, in order to guarantee that the operating mode of the first subframe is not subjected to collision with the operating mode of the second subframe, there may be various implementing manners, for example:

if the first base station needs a subframe in a downlink transmission mode, when the operating mode of the second subframe is a blank mode or an approximately blank mode, the first base station can configure the operating mode of the first subframe to be configured as the downlink transmission mode; or if the first base station needs a subframe in a downlink transmission mode, when the operating mode of the second subframe is an uplink transmission mode, and the first base station acquires that the second base station can switch the operating mode of the second subframe to an approximately blank mode or a blank mode after detecting that the operating mode of the first subframe is a downlink transmission mode, then the first base station can configure the operating mode of the first subframe as the downlink transmission mode, the acquiring method of the first base station can include a system specification, a previously negotiated agreement of the two base stations; or if the first base station needs a subframe in a downlink transmission mode, when the operating mode of the second subframe is an uplink transmission mode, the first base station can configure the operating mode of the first subframe to be configured as an approximately blank mode or a blank mode; or if the first base station needs a subframe in an uplink transmission mode, when the operating mode of the second subframe is a blank mode or an approximately blank mode, the first base station can configure the operating mode of the first subframe to be configured as the uplink transmission mode; or if the first base station needs a subframe in an uplink transmission mode, when the operating mode of the second subframe is an uplink transmission mode, the first base station can configure the operating mode of the first subframe to be configured as an approximately blank mode or a blank mode; or if the first base station needs a subframe in an uplink transmission mode, when the operating mode of the second subframe is uplink transmission mode, the first base station can configure the operating mode of the first subframe to be configured as the uplink transmission mode.

Furthermore, being not subjected to collision as discussed above can be specified as: a ratio of the intensity of a signal, received by the first base station, at the first subframe of a corresponding first user equipment to the intensity of a signal, received by the first base station, at the second subframe of the second base station is larger than a pre-set first threshold; or, a ratio of the intensity of a signal, received by the first base station, at the first subframe of a corresponding first user equipment to the intensity of a signal, received by the first base station, at the second subframe of a second user equipment corresponding to the second base station is larger than a pre-set second threshold; or a ratio of the intensity of a signal, received by the first user equipment, at the first subframe of the first base station to the intensity of a signal, received by the first user equipment, at the second subframe of the second base station is larger than a pre-set third threshold; or a ratio of the intensity of a signal, received by the first user equipment, at the first subframe of the first base station to the intensity of a signal, received by the first user equipment, at the second subframe of a second user equipment corresponding to the second base station is larger than a pre-set fourth threshold.

For example: if the first base station needs to configure the operating mode of subframe 4 as an uplink transmission mode (i.e. configure the first subframe of the first base station as a U subframe), after acquiring that the operating mode of subframe 4 of the second base station is an uplink transmission mode (i.e. the second subframe of the second base station is configured as a U subframe), the first base station can detect uplink interference at subframe 4 of the first base station, that is, detect whether a ratio of the intensity of a signal, received by the first base station, of a corresponding first user equipment to the intensity of a signal, received by the first base station, of a second user equipment is larger than a pre-set second threshold, the first base station determines whether the operating mode of subframe 4 of the first base station should be configured as an uplink transmission mode or a blank mode; if the detection result is smaller than the pre-set second threshold, then the operating mode of subframe 4 is configured as the blank mode, not the uplink transmission mode, so as to avoid uplink interference; otherwise, if the detection result is larger than the pre-set second threshold, then the operating mode of subframe 4 is configured as the uplink transmission mode according to requirements of the current traffic, free of strong interference of the second base station. Generally, the first base station can configure the operating mode of the subframe to be configured only taking into consideration of uplink and downlink interference, that is, the uplink interference and the downlink interference can be considered to be acceptable or allowable.

Specifically, in this embodiment, the first base station can determine the needed operating mode (uplink transmission mode, downlink transmission mode, blank mode and approximately blank mode) according to relative traffic information (traffic requirement) of the user equipment. If the first base station needs a subframe in an uplink transmission mode to transmit uplink traffic, then selects a subframe with highest priority among the idle subframes (i.e. a configurable subframe: a subframe which is not transmitting or receiving information, and whether it will collide with the adjacent base station after configured as uplink transmission mode is presently unknown) as the subframe to be configured; if the first base station needs a subframe in a downlink transmission mode to transmit downlink traffic, then selects a subframe with lowest priority among the idle subframes (i.e. a configurable subframe: a subframe which is not transmitting or receiving information, and whether it will collide with the adjacent base station after configured as downlink transmission mode is presently unknown) as the subframe to be configured, vice versa, this embodiment is not limited thereto. In this way, the probability of collision after the base station subsequently reconfigures the operating mode of a subframe can be effectively avoided, thus increasing quality of air interface signals.

In this step, the priority of a subframe can be configured in many manners. Two preferable implementing manners will be illustrated below.

In a first implementing manner, according to a basic principle, i.e. the priority of a subframe specified as an uplink transmission mode by a system is higher than the priority of a subframe which can be flexibly configured as various operating modes, the priority of the subframe which can be flexibly configured as various operating modes is higher than the priority of a subframe specified as a downlink transmission mode by the system, and 10 priority orders are predefined, the first base station determines the priority of idle subframes within the 10 priority orders, the idle subframe with a high priority still has a high priority, the idle subframe with a low priority still has a low priority. For example: assuming that the first base station has 10 subframes: that is, subframe 0 to subframe 9 respectively are D subframe, special (S) subframe, U subframe, F subframe, F subframe, D subframe, S subframe, U subframe, F subframe, F subframe, and the priorities of the 10 subframes are predefined that: from the highest to the lowest, subframe 2, subframe 7, subframe 3, subframe 8, subframe 4, subframe 9, subframe 5, subframe 0, subframe 6, subframe 1; assuming that the idle subframes are subframes 3, 4, 5, 7, 8, 9, then the priority of the six subframes are: from the highest to the lowest: subframe 7, subframe 3, subframe 8, subframe 4, subframe 9, subframe 5.

In a second implementing manner, the first base station classifies the priority of all the idle subframes into two layers, in the first layer, the priority of subframe specified as an uplink transmission mode by a system is higher than that of subframe which can be flexibly configured as various operating modes, the priority of the subframe which can be flexibly configured as various operating modes is higher than that of subframe which is specified as a downlink transmission mode; in the second layer, among the subframes with highest priority and among the subframes with lowest priority, priority of subframes which is near the subframe in an uplink transmission mode is higher, priority of subframes which is near the subframe in a downlink transmission mode is lower, priority of subframes with the same distance is classified according to their numbers of subframe. Specifically, for example: assuming the first base station has 10 subframes: that is, subframe 0 to subframe 9 respectively are D subframe, special (S) subframe, U subframe, F subframe, F subframe, D subframe, S subframe, U subframe, F subframe, F subframe, assuming that the idle subframes are subframes 3, 4, 5, 7, 8, 9, in the first layer, the subframe with highest priority is subframe 7 as a U subframe, then are subframes 3, 4, 8, 9, the subframe with lowest priority is subframe 5 as a D subframe, in the second layer, subframes 4, 9 are closest to subframes 5, 0 which are D subframes, subframes 3, 8 are closest to subframes 2, 7 which are U subframes, so priority of subframes 3, 8 are higher than priority of subframes 4, 9, between subframes 3, 8, the number of subframe 3 is smaller than the number of subframe 8, so the priority of subframe 3 is higher than the priority of subframe 8, between subframes 4, 9, the number of subframe 4 is smaller than the number of subframe 9, so the priority of subframe 4 is higher than the priority of subframe 9. The final priority of the six idle subframes from the highest to the lowest are: subframe 7, subframe 3, subframe 8, subframe 4, subframe 9, subframe 5.

For example: for a specific subframe, such as subframe 0, in TDD system, specified as a downlink subframe, if it is not used or configured, then subframe 0 can be defined as a subframe with the lowest priority, when the base station has downlink traffic requirement, that is, needs to configure subframe in a downlink transmission mode, the base station firstly will consider whether the operating mode of subframe 0 can be reconfigured as downlink transmission mode. If the first base station acquires that the subframe 0 of the second base station is configured as a D subframe, and the user equipment corresponding to the first base station detects a strong interference from the second base station, the user equipment corresponding to the first base station can feed the intensity of the interference back to the first base station, the first base station sends a request to the second base station, requesting the second base station to configure subframe 0 as an A subframe, the second base station sends the configuration information of subframe 0 to the first base station; if the second base station configures subframe 0 as an A subframe, then the first base station can use subframe 0 to transmit downlink information, if the second base station configures subframe 0 as a D subframe, the first base station configures subframe 0 as an A subframe, or allows subframe 0 only serve the user equipment which is near the first base station. Furthermore, when the first base station is using subframe 0 and cannot meet the traffic requirement of downlink information transmission, the first base station begins to detect subframes with lower priority, such as: subframe 5, and repeat above steps.

Furthermore, before step 102, this embodiment can further include a step of the first base station acquiring the operating mode of the second subframe, the first base station can acquire the operating mode of the second subframe according to the corresponding operating mode information of the second base station sent by the first user equipment, such as by adding a signal element in the interference coordination information of the second base station sent by the first user equipment of the prior art to instruct the operating mode information of the second base station; or the first base station can also acquire the operating mode of the second subframe according to the operating mode information sent by the second base station, such as by adding a signal element in the interference coordination information of the second base station sent by the second base station of the prior art to instruct the operating mode information of the second base station, specifically, the first base station can acquire the operating mode of the second subframe according to the operating mode information sent by the second base station and received through the communication interface between the first base station and the second base station, the interface can include, but not limit to, an X2 interface or a space wireless interface; or the first base station can also acquire the operating mode of the second subframe according to a reference signal in the second subframe, such as cell specific reference signal (Cell Specific Reference Signal, CRS), channel state information-reference signal (Channel State Information-Reference Signal, CSI-RS) etc, for example: at the subframe, by performing cross-correlation calculation between the CRS or CSI-RS received by the second base station and the CRS or CSI-RS generated by the local receiver corresponding to the second base station, and comparing the result R1 with a predefined threshold T1, if R1 is larger than T1, it means that the operating mode of the second base station is a downlink operating mode; by performing cross-correlation calculation between the DM RS received by the user equipment in two time slots, and comparing the result R2 with a predefined threshold T2, if R2 is larger than T2, it means that the operating mode of the second base station is an uplink operating mode.

In order to make the method provided in embodiments of the present invention more clear, an example will be illustrated with two adjacent base stations: the first base station and the second base station in a TDD system.

A subframe of the first base station can adopt a configuration 1 in a traditional TDD system, that is, subframe 0 to subframe 9 are D subframe, special (S) subframe, U subframe, U subframe, D subframe, D subframe, S subframe, U subframe, U subframe, D subframe, respectively, for a TDD system which has the ability to flexibly configure uplink and downlink, subframes 0, 4, 5, 9 are specified as D subframe, subframes 1, 6 are specified as S subframe, subframes 2, 7 are specified as U subframe, subframes 3, 8 are specified as F subframe, that is subframe 0 to subframe 9 are D subframe, special (S) subframe, U subframe, F subframe, D subframe, D subframe, S subframe, U subframe, F subframe, D subframe, respectively.

Similarly, a subframe of the second base station can adopt a configuration 1 in a traditional TDD system, that is, subframe 0 to subframe 9 are D subframe, special (S) subframe, U subframe, U subframe, D subframe, D subframe, S subframe, U subframe, U subframe, D subframe, respectively. For a TDD system which has the ability to flexibly configure uplink and downlink, subframes 0, 4, 5, 9 are specified as D subframe, subframes 1, 6 are specified as S subframe, subframes 2, 7 are specified as U subframe, subframes 3, 8 are specified as F subframe, that is, subframe 0 to subframe 9 are D subframe, special (S) subframe, U subframe, F subframe, D subframe, D subframe, S subframe, U subframe, F subframe, D subframe, respectively.

When subframe 0, subframe 1, subframe 2, subframe 4, subframe 5, subframe 6, subframe 7, subframe 9 of the first base station are used for transmitting information or sending information, i.e. the subframes not in use are subframe 3, subframe 8, priority of these two subframes is: the priority of subframe 3 is higher than that of subframe 8.

Utilizing the method provided by embodiments of the present invention, operating mode configuration can be applied to the two F subframes in the first base station which can be flexibly configured, such that the first base station is not affected by strong interference of the second base station.

Specific implementing manners are as follows:

(1). The first base station has two idle subframes, i.e. subframe 3 and subframe 8, according to the predefined priority information, the priority of subframe 3 is higher than that of subframe 8; if the first base station needs a D subframe, then according to the priority information, the first base station selects a subframe with low priority, i.e. subframe 8 as the subframe to be configured; when the operating mode of the second subframe of the second base station is an uplink transmission mode or a blank mode or an approximately blank mode, the first base station configures the first subframe to be configured as a downlink transmission mode; when the operating mode of the second subframe is a downlink transmission mode, and the ratio of the intensity of a signal of the first base station received by the first user equipment to the intensity of a signal of the second base station received by the first user equipment is larger than the pre-set third threshold, the first base station configures the first subframe to be configured as downlink transmission mode; if the second base station detects that its uplink signal is affected by strong interference, then it will not use the second subframe to send uplink signal, and send a notification to the corresponding second user equipment, so as to instruct the second user equipment to stop the uplink HARQ process in the second subframe, and instruct the second user equipment to send the unsuccessfully transmitted data packet in the buffer using the uplink HARQ process in another subframe, and reconfigure the second subframe, for example: configure the second subframe as a D subframe or a B subframe.

(2). The first base station has two idle subframes, i.e. subframe 3 and subframe 8, according to the predefined priority information, the priority of subframe 3 is higher than that of subframe 8; if the first base station needs a D subframe, then according to the priority information, the first base station selects a subframe with low priority, i.e. subframe 8, as the subframe to be configured; the first base station monitors at the subframe to be configured at first, tracks the operating mode of the second base station on the second subframe, when monitoring that the second subframe is configured as an A subframe or a B subframe, the first base station configures the idle subframe as a D subframe; when monitoring that the second subframe is configured as a D subframe, and the ratio of the intensity of the signal of the first base station received by the first user equipment to the intensity of the signal of the second base station received by the first user equipment is larger than the pre-set third threshold, the first base station configures the first subframe to be configured as downlink transmission mode; when monitoring that the second subframe is configured as a U subframe, the first base station configures the first subframe to be configured as an approximately blank mode or a blank mode.

(3). The first base station has two idle subframes, i.e. subframe 3 and subframe 8, according to the predefined priority information, the priority of subframe 3 is higher than that of subframe 8; if the first base station needs a U subframe, then according to the priority information, the first base station selects a subframe with higher priority, i.e. subframe 3 as the subframe to be configured; the first base station monitors the idle subframe at first, tracks the operating mode of the second base station on the second subframe, when monitoring that the second subframe is configured as an A subframe or a B subframe, the first base station configures the idle subframe as a U subframe; when monitoring that the second subframe is configured as a U subframe, and the ratio of the intensity of the signal of the first user equipment received by the first base station to the intensity of the signal of the second user equipment received by the first base station is larger than the pre-set second threshold, the first base station configures the idle subframe as a U subframe; when monitoring that the second subframe is configured as a D subframe, and the ratio of the intensity of the signal of the first user equipment received by the first base station to the intensity of the signal of the second base station received by the first base station is larger than the pre-set first threshold, the first base station configures the idle subframe as a U subframe.

In this embodiment, the first base station configures the operating mode of a first subframe according to the operating mode of a second subframe, corresponding to the first subframe, of a second base station, after determining the first subframe to be configured according to the priority information of the subframe, due to the operating mode configured for the first subframe of the first base station is not subjected to collision with the operating mode of the second subframe, strong interference to the first base station from the second base station can be avoided, thus increasing quality of air interface signals.

It should be noted that, in this embodiment, the base station adjacent to the first base station can be one or more, the second base station can be any base station adjacent to the first base station, and this will not be limited in the present invention.

It should be noted that, the method for configuring a subframe in this embodiment can be applied to a TDD system with a configurable subframe, also can be applied to an FDD system with a configurable subframe.

Figure 2:
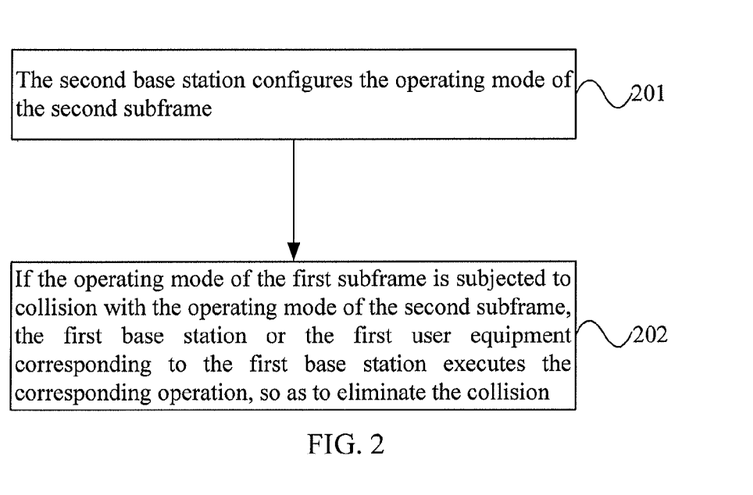
FIG. 2 is a schematic flow diagram of a method for configuring a subframe provided by Embodiment 2 of the present invention.

FIG. 2 is a schematic flow diagram of a method for configuring a subframe provided by Embodiment 2 of the present invention, as shown in FIG. 2, comparing with the above embodiment, the method for configuring a subframe in this embodiment can further include the following steps:

Step 201, the second base station configures the operating mode of the second subframe;

in this step, optionally, when the second base station has traffic change, such as sudden increasing of uplink traffic or downlink traffic, or there is other need, the second base station can configure the operating mode of the second subframe;

Step 202, if the operating mode of the first subframe is subjected to collision with the operating mode of the second subframe, the first base station or the first user equipment corresponding to the first base station executes the corresponding operation, so as to eliminate the collision, that is the first base station sends a notification message to the first user equipment to instruct the first user equipment to stop the uplink hybrid automatic repeat request (Hybrid Automatic Repeat request, HARQ) process corresponding to the first subframe, and instruct the first user equipment to send the unsuccessfully transmitted data packet in the buffer using the uplink HARQ process corresponding to another subframe, and reconfigure the first subframe; or the first user equipment stops the uplink HARQ process corresponding to the first subframe, and uses the uplink HARQ process corresponding to another subframe of the first base station to send the unsuccessfully transmitted data packet in the buffer.

In order to make the method provided by embodiments of the present invention more clear, an example will be illustrated with two adjacent base stations: a base station A and a base station B in a TDD system.

A subframe of the base station A can adopt a configuration 1 in a traditional TDD system, that is, subframe 0 to subframe 9 are D subframe, special (S) subframe, U subframe, U subframe, D subframe, D subframe, S subframe, U subframe, U subframe, D subframe, respectively, for a TDD system which has the ability to flexibly configure uplink and downlink, subframes 0, 4, 5, 9 are specified as D subframe, subframes 1, 6 are specified as S subframe, subframes 2, 7 are specified as U subframe, subframes 3, 8 are specified as F subframe, that is, subframe 0 to subframe 9 are D subframe, special (S) subframe, U subframe, F subframe, D subframe, D subframe, S subframe, U subframe, F subframe, D subframe, respectively.

Similarly, a subframe of the base station B can adopt a configuration 1 in traditional TDD system, that is, subframe 0 to subframe 9 are D subframe, special (S) subframe, U subframe, U subframe, D subframe, D subframe, S subframe, U subframe, U subframe, D subframe, respectively. For a TDD system which has the ability to flexibly configure uplink and downlink, subframes 0, 4, 5, 9 are specified as D subframe, subframes 1, 6 are specified as S subframe, subframes 2, 7 are specified as U subframe, subframes 3, 8 are specified as F subframe, that is, subframe 0 to subframe 9 are D subframe, special (S) subframe, U subframe, F subframe, D subframe, D subframe, S subframe, U subframe, F subframe, D subframe, respectively.

When subframe 0, subframe 1, subframe 2, subframe 4, subframe 5, subframe 6, subframe 7, subframe 9 of the base station A or the base station B are used for transmitting information or sending information, i.e. the subframes not in use are subframe 3, subframe 8, priority of these two subframes is: the priority of subframe 3 is higher than that of subframe 8.

Utilizing the method provided by embodiments of the present invention, operating mode configuration can be applied to the two F subframes in the base station A or the base station B which can be flexibly configured, such that there is no uplink or downlink interference between the two base stations.

Specific implementing manners are as follows:

(1). If the base station A configures two F subframe 3, 8 as UU respectively, and the base station B configures two F subframe as BB (all blank subframes), UB (one is configured as uplink subframe, the other is configured as blank subframe) or UU (all uplink subframes), then there is no uplink or downlink interference between the base stations. If the base station B needs a D subframe, according to the priority information, the base station B selects subframe with low priority, i.e. subframe 8, or subframe 8 and subframe 3, as the subframe to be configured, that is, the base station B configures the two F subframe as UD, BD or DD, then the base station B sends a downlink signal on the one or two F subframes directly, at the same time the base station A detects that its uplink signal is affected by strong interference, then it will not use the one or two F subframes to send uplink signal, and send notification message to the corresponding user equipment, so as to instruct the user equipment to stop the uplink HARQ process on the one or two F subframes, and instruct the user equipment to send the unsuccessfully transmitted data packet in the buffer using the uplink HARQ process of another subframe, and reconfigure the first subframe, for example: configure the one or two F subframe as D subframes or B subframes.

(2). The base station A configures two F subframes 3, 8 as UU respectively, if the base station B configures the two F subframes as BB, UB or UU, then there is no uplink and downlink interference between the base stations. If the base station B needs a D subframe, according to the priority information, the base station B selects subframe with low priority, i.e. subframe 8, or subframe 8 and subframe 3, as the subframe to be configured, that is, the base station B configures the two F subframe as UD, BD or DD, then the base station B monitors on the one or two F subframes at first, tracks the operating mode of the base station A on the F subframe, when monitoring that the one or two F subframes of the base station A are configured as B subframes or D subframes, then configures the one or two F subframes as D subframes.

(3). The base station A configures two F subframes 3, 8 as UB respectively, if the base station B configures the two F subframes as BB, UB UD or BD, then there is no uplink and downlink interference between the base stations. If the base station B configures as BD, and needs a D subframe, according to the priority information, the base station B selects subframe with low priority, i.e. subframe 3, as the subframe to be configured, that is, the base station B needs to configure the two F subframe as DD, then the base station B sends a downlink signal on the one or two F subframes directly, at the same time the base station A detects that the uplink signal on subframe 3 is affected by strong interference, then it will not use subframe 3 to send uplink signal, and send notification message to the corresponding user equipment, so as to instruct the user equipment to stop the uplink HARQ process on that F subframes, and instruct the user equipment to send the unsuccessfully transmitted data packet in the buffer using the uplink HARQ process of another subframe, and reconfigure the first subframe, for example: configure the F subframe as D subframes or B subframes.

(4). The base station A configures two F subframes 3, 8 as UB respectively, if the base station B configures the two F subframes as BB, UB UD or BD, then there is no uplink and downlink interference between the base stations. If the base station B configures as BD, and needs a D subframe, according to the priority information, the base station B selects subframe with low priority, i.e. subframe 3, as the subframe to be configured, that is, the base station B needs to configure the two F subframe as DD, then the base station B monitors on subframe 3 at first, when monitoring that the operating mode of the base station A on subframe 3 is B, then configures the F subframe as D subframe.

(5). The base station B configures two F subframes 3, 8 as DD respectively, if the base station A configures the two F subframes as BB, BD or DD, then there is no uplink and downlink interference between the base stations. If the base station A needs a U subframe, according to the priority information, the base station A selects subframe with high priority, i.e. subframe 3, or subframe 3 and subframe 8, as the subframe to be configured, that is, the base station A needs to configure two F subframes as UD, UB or UU, then the base station A needs to wait for the base station B to stop using the one or two D subframes. When the base station A detects that the base station B configures two F subframes as BD or BB, then the base station A can use the one or two F subframes to send uplink signal, that is, configure the one or two F subframes as U subframes.

(6). The base station B configures two F subframes as BD respectively, if the base station A configures the two F subframes as UB, BB, BD or UD, then there is no uplink and downlink interference between the base stations. If the base station A configures as UB and needs a U subframe, according to the priority information, the base station A selects subframe with high priority, here it is subframe 8, as the subframe to be configured, that is, the base station A needs to configure the two F subframes as UU, then the base station A needs to wait for the base station B to stop using the D subframes. When the base station A detects that the base station B configures two F subframes as BB, then the base station A can use the two F subframes to send uplink signal, that is, configure the two F subframes as U subframes.

In this embodiment, after the second base station configures the operating mode of the second subframe, if the operating mode of the first subframe is subjected to collision with the operating mode of the second subframe, then through the first base station or the first user equipment corresponding to the first base station executing corresponding operation, the above collision can be eliminated, strong interference to the first base station from the second base station can be avoided, thus increasing quality of air interface signals.

Figure 3:
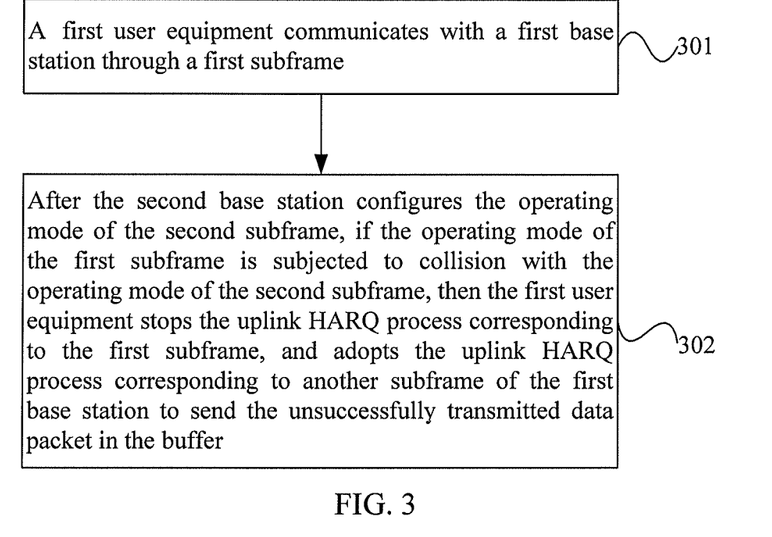
FIG. 3 is a schematic flow diagram of a method for processing data provided by Embodiment 3 of the present invention.

FIG. 3 is a schematic flow diagram of a method of data processing provided by Embodiment 3 of the present invention, as shown in FIG. 3, the method for processing data can include the following steps:

Step 301, a first user equipment communicates with a first base station through a first subframe; the first subframe is a subframe to be configured determined by the base station according to the priority information of the subframe; the operating mode of the first subframe is configured according to the operating mode of a second subframe, corresponding to the first subframe, of a second base station, such that the operating mode of the first subframe is not subjected to collision with the operating mode of the second subframe;

Step 302, after the second base station configures the operating mode of the second subframe, if the operating mode of the first subframe is subjected to collision with the operating mode of the second subframe, then the first user equipment stops the uplink HARQ process corresponding to the first subframe, and adopts the uplink HARQ process corresponding to another subframe of the first base station to send the unsuccessfully transmitted data packet in the buffer.

In this embodiment, the configuration method of the first subframe refers to the contents in Embodiment 1 and Embodiment 2 of the present invention, and will not be described here.

Furthermore, in step 302, before the first user equipment stops the uplink HARQ process corresponding to the first subframe, the first user equipment can further execute the following step:

The first user equipment receives a notification message sent by the first base station, the notification message is to instruct the first user equipment to stop the uplink HARQ process corresponding to the first subframe, and instruct the first user equipment to use the uplink HARQ process corresponding to another subframe of the first base station to send the unsuccessfully transmitted data packet in the buffer.

In this embodiment, after the second base station configures the operating mode of the second subframe, if the operating mode of the first subframe is subjected to collision with the operating mode of the second subframe, then the first user equipment can stop the uplink HARQ process corresponding to the first subframe, and adopts the uplink HARQ process corresponding to another subframe of the first base station to send the unsuccessfully transmitted data packet in the buffer, such that strong interference to the first base station from the second base station can be avoided, thus increasing quality of air interface signals.

It should be noted that, for ease of description in the method embodiments above, the method is described as a series of operations, and persons skilled in the art should be aware that the order of operations described herein shall not be construed as limiting the present invention because certain steps may occur in different order or occur simultaneously according to embodiments of the present invention. Also, it is understood that the aforesaid preferred embodiments described in the specification belong to preferred options, so the present invention does not necessarily have to include all the associated operations and modules.

In the foregoing embodiments, each embodiment emphasizes a specific aspect, and for the part not detailed in one embodiment, reference can be made to the relevant description of that part in another embodiment.

Figure 4:
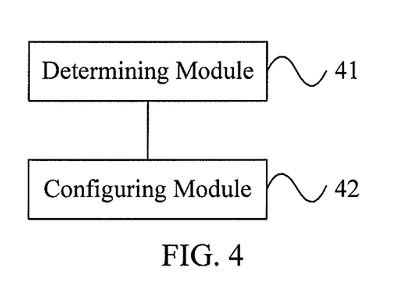
FIG. 4 is a schematic structural diagram of a base station provided by Embodiment 4 of the present invention.

FIG. 4 is a schematic structural diagram of a base station provided by Embodiment 4 of the present invention, as shown in FIG. 4, the base station in this embodiment can include a determining module 41 and a configuring module 42. The determining module 41 is configured to determine a first subframe to be configured according to the priority information of the subframe; the configuring module 42 is adapted to configure the operating mode of the first subframe according to the operating mode of a second subframe, corresponding to the first subframe, of an adjacent base station, determined by the determining module and configure the operating mode of the first subframe, such that the operating mode of the first subframe is not subjected to collision with the operating mode of the second subframe.

The function of the first base station in Embodiments 1, 2 and 3 of the present invention can be achieved by the base station provided by this embodiment of the present invention.

Specifically, if the base station needs a subframe in a downlink transmission mode, when the operating mode of the second subframe is an uplink transmission mode, and the base station acquires that the adjacent base station can switch the operating mode of the second subframe to an approximately blank mode or a blank mode after detecting that the operating mode of the first subframe is the downlink transmission mode, then the configuring module 42 can specifically configure the operating mode of the first subframe as downlink transmission mode; or if the base station needs a subframe of a downlink transmission mode, when the operating mode of the second subframe is a downlink transmission mode, the configuring module can specifically configure the operating mode of the first subframe as a blank mode or an approximately blank mode.

Specifically, if a subframe in an uplink transmission mode is needed, the configuring module 42 can select a subframe with the highest priority among configurable subframes as the first subframe to be configured according to the priority information of the subframes; if a subframe in a downlink transmission mode is needed, the configuring module 42 can specifically select a subframe with the lowest priority among configurable subframes as the first subframe to be configured according to the priority information of the subframes.

Figure 5:
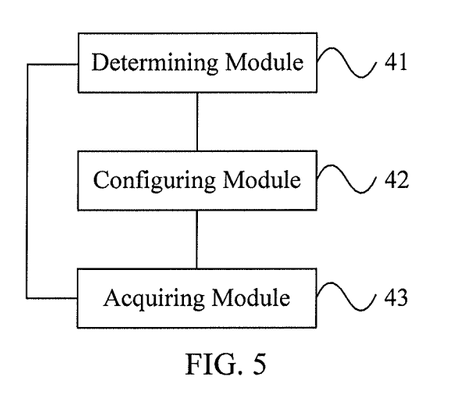
FIG. 5 is another schematic structural diagram of a base station provided by Embodiment 4 of the present invention.

Furthermore, as shown in FIG. 5, the base station in this embodiment can further include an acquiring module 51, configured to acquire the operating mode of the second subframe; correspondingly, the configuring module 42 can specifically configure the operating mode of the first subframe according to the operating mode of the second subframe acquired by the acquiring module 51. Specifically, the acquiring module 51 can acquire the operating mode of the second subframe according to the operating mode information of the adjacent base station sent by the corresponding first user equipment; or can acquire the operating mode of the second subframe according to the reference signal on the second subframe.

In this embodiment, after the determining module determines the first subframe to be configured, the configuring module configures the operating mode of the first subframe according the operating mode of the second subframe, corresponding to the first subframe, of the adjacent base station, as the operating mode of the first subframe configured by the configuring module is not subjected to collision with the operating mode of the second subframe, strong interference to the base station from the adjacent base station can be avoided, thus increasing quality of air interface signals.

Figure 6:
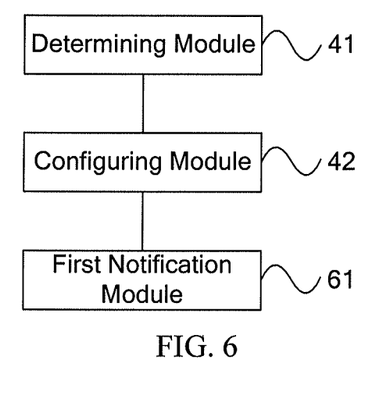
FIG. 6 is a schematic structural diagram of a base station provided by Embodiment 5 of the present invention.

FIG. 6 is a schematic structural diagram of an base station provided by Embodiment 5 of the present invention, as shown in FIG. 6, on the basis of the above embodiment, the base station in this embodiment can further include a first notification module 61 configured to: after the adjacent base station configures the operating mode of the second subframe, if the operating mode of the first subframe is subjected to collision with the operating mode of the second subframe, send a notification message to the corresponding first user equipment, and instruct the first user equipment to stop the HARQ process corresponding to the first subframe, and instruct the first user equipment to send the unsuccessfully transmitted data packet in the buffer using the uplink HARQ process corresponding to another subframe of the base station, and notify the configuring module 42 to reconfigure the first subframe.

In this embodiment, after the adjacent base station configures the operating mode of the second subframe, if the operating mode of the first subframe is subjected to collision with the operating mode of the second subframe, then the first notification module can execute corresponding operation, so as to eliminate above collision, strong interference to the base station from the adjacent base station can be avoided, thus increasing quality of air interface signals.

Figure 7:
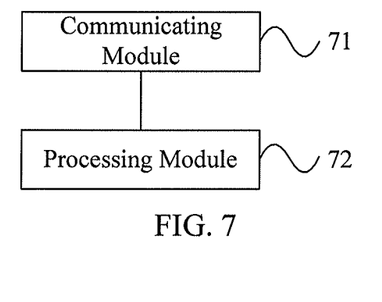
FIG. 7 is a schematic structural diagram of a user equipment provided by Embodiment 6 of the present invention.

FIG. 7 is a schematic structural diagram of a user equipment provided by Embodiment 6 of the present invention, as shown in FIG. 7, the user equipment in this embodiment can include a communicating module 71 and a processing module 72. The communicating module 71 is configured to communicate with the first base station through the first subframe; the first subframe is a subframe to be configured determined by the first base station according to the priority information; the operating mode of the first subframe is configured by the first base station according to the operating mode of the second subframe, corresponding to the first subframe, of the second base station, such that the operating mode of the first subframe is not subjected to collision with the operating mode of the second subframe; the processing module 72 is configured to: after the second base station configures the operating mode of the second subframe, if the operating mode of the first subframe is subjected to collision with the operating mode of the second subframe, stop the uplink HARQ process corresponding to the first subframe, and send the unsuccessfully transmitted data packet in the buffer using the uplink HARQ process corresponding to another subframe of the first base station.

The function of the first user equipment in Embodiment 3 of the present invention can be achieved by the user equipment provided by this embodiment of the present invention.

Furthermore, the communicating module 71 in this embodiment can further receive the notification message sent by the first base station, the notification message is to instruct the user equipment to stop the uplink HARQ process corresponding to the first subframe, and instruct the user equipment to send an unsuccessfully transmitted data packet in a buffer using an uplink HARQ process corresponding to another subframe of the first base station.

In this embodiment, after the second base station configures the operating mode of the second subframe, if the operating mode of the first subframe is subjected to collision with the operating mode of the second subframe, then the user equipment can stop an uplink HARQ process corresponding to the first subframe through the processing module, and send an unsuccessfully transmitted data packet in a buffer using an uplink HARQ process corresponding to another subframe of the first base station.

Persons skilled in the art should understand that all or a part of the steps in the method embodiments may be implemented by relevant hardware under the instruction of a program. The program may be stored in a computer readable storage medium, when the program is executed, the steps of above method embodiments are executed. The storage medium includes: ROM, RAM, floppy disk, optical disk or all other medium that can store the programming code.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

What is claimed is:

1. A method for configuring a subframe, comprising:
   determining, by a first base station, a first subframe to be configured according to priority information of subframes; and
   configuring, by the first base station, an operating mode of the first subframe according to an operating mode of a second subframe, corresponding to the first subframe, of a second base station, such that the operating mode of the first subframe is not subjected to collision with the operating mode of the second subframe;
   wherein after the configuring, by the first base station, the operating mode of the first subframe according to the operating mode of the second subframe, corresponding to the first subframe, of the second base station, the method further comprising:
   after configuring, by the second base station, the operating mode of the second subframe, if the operating mode of the first subframe is collided with the operating mode of the second subframe, then:
   sending, by the first base station to a corresponding first user equipment, a notification message to instruct the first user equipment to stop an uplink HARQ process corresponding to the first subframe and instruct the first user equipment to send an unsuccessfully transmitted data packet in a buffer to the first base station using an uplink HARQ process corresponding to another subframe of the first base station, and reconfiguring, by the first base station, the first subframe; or
   stopping, by the first user equipment, an uplink HARQ process corresponding to the first subframe, and sending an unsuccessfully transmitted data packet in the buffer to the first base station using an uplink HARQ process corresponding to another subframe of the first base station.

2. The method according to claim 1, wherein:
   the operating mode of the first subframe or the second subframe comprises at least one of an uplink transmission mode, a downlink transmission mode, a blank mode and an approximately blank mode.

3. The method according to claim 1, wherein the configuring, by the first base station, the operating mode of the first subframe according to the operating mode of the second subframe, corresponding to the first subframe, of the second base station, such that the operating mode of the first subframe is not subjected to collision with the operating mode of the second subframe, comprises:
   configuring, by the first base station, the operating mode of the first subframe as a downlink transmission mode, if the first base station needs a subframe in a downlink transmission mode, and when the operating mode of the second subframe is an uplink transmission mode, and the first base station acquires that the second base station can switch the operating mode of the second subframe to an approximately blank mode or a blank mode after detecting that the operating mode of the first subframe is a downlink transmission mode; or
   configuring, by the first base station, the operating mode of the first subframe as an approximately blank mode or a blank mode, if the first base station needs a subframe in a downlink transmission mode, and when the operating mode of the second subframe is an uplink transmission mode.

4. The method according to claim 1, before the configuring, by the first base station, the operating mode of the first subframe according to the operating mode of the second subframe, corresponding to the first subframe, of the second base station, the method further comprises:

acquiring, by the first base station, the operating mode of the second subframe.

5. The method according to claim 4, wherein the acquiring, by the first base station, the operating mode of the second subframe, comprises:

acquiring, by the first base station, the operating mode of the second subframe according to operating mode information of the second base station sent by a corresponding first user equipment; or acquiring, by the first base station, the operating mode of the second subframe according to operating mode information sent by the second base station; or acquiring, by the first base station, the operating mode of the second subframe according to a reference signal on the second subframe.

6. The method according to claim 5, wherein the acquiring, by the first base station, the operating mode of the second subframe according to the operating mode information sent by the second base station, comprises:

acquiring, by the first base station, the operating mode of the second subframe according to the operating mode information sent by the second base station and received by a communication interface between the first base station and the second base station, wherein, the communication interface comprises an X2 interface or a space wireless interface.

7. The method according to claim 1, wherein the determining, by the first base station, the first subframe to be configured according to the priority information of the subframes, comprises:

selecting, by the first base station, a subframe with the highest priority among configurable subframes as the first subframe to be configured according to the priority information of the subframes, if a subframe in an uplink transmission mode is needed; or selecting, by the first base station, a subframe with the lowest priority among configurable subframes as the first subframe to be configured according to the priority information of the subframes, if a subframe in a downlink transmission mode is needed.

8. The method according to claim 7, wherein in a priority identified by the priority information of the subframes:

the priority of a subframe specified as an uplink transmission mode by a system is higher than the priority of a subframe which can be flexibly configured as various operating modes, and the priority of the subframe which can be flexibly configured as various modes is higher than the priority of a subframe specified as a downlink transmission mode by the system.

9. The method according to claim 1, wherein the operating mode of the first subframe being not subjected to collision with the operating mode of the second subframe comprises:

a ratio of an intensity of a signal, received by the first base station at the first subframe of a corresponding first user equipment to an intensity of a signal, received by the first base station at the second subframe of the second base station is larger than a pre-set first threshold; or a ratio of an intensity of a signal, received by the first base station at the first subframe of a corresponding first user equipment to an intensity of a signal, received by the first base station at the second subframe of a second user equipment corresponding to the second base station is larger than a pre-set second threshold; or a ratio of an intensity of a signal, received by the first user equipment at the first subframe of the first base station to an intensity of a signal, received by the first user equipment at the second subframe of the second base station is larger than a pre-set third threshold; or a ratio of an intensity of a signal, received by the first user equipment at the first subframe of the first base station to an intensity of a signal, received by the first user equipment at the second subframe of a second user equipment corresponding to the second base station is larger than a pre-set fourth threshold.

10. A method for processing data, comprising:

communicating, by a first user equipment, with a first base station through a first subframe; wherein the first subframe is a subframe to be configured, determined by the first base station, according to priority information of subframes; an operating mode of the first subframe is configured, by the first base station, according to an operating mode of a second subframe, corresponding to the first subframe, of a second base station, such that the operating mode of the first subframe is not subjected to collision with the operating mode of the second subframe;

after configuring, by the second base station, the operating mode of the second subframe, if the operating mode of the first subframe is subjected to collision with the operating mode of the second subframe, then stopping, by the first user equipment, an uplink HARQ process corresponding to the first subframe, and sending an unsuccessfully transmitted data packet in a buffer to the first base station using an uplink HARQ process corresponding to another subframe of the first base station.

11. The method according to claim 10 wherein, before the stopping, by the first user equipment, the uplink HARQ process corresponding to the first subframe, the method further comprising:

receiving, by the first user equipment, a notification message sent by the first base station, wherein, the notification message is to instruct the first user equipment to stop an uplink HARQ process corresponding to the first subframe, and instruct the first user equipment to send the unsuccessfully transmitted data packet in the buffer to the first base station using an uplink HARQ process corresponding to another subframe of the first base station.

12. A base station, comprising:

a determining module, configured to determine a first subframe to be configured according to priority information of subframes; and a configuring module, adapted to configure an operating mode of the first subframe according to an operating mode of a second subframe, corresponding to the first subframe determined by the determining module, of an adjacent base station, such that the operating mode of the first subframe is not subjected to collision with the operating mode of the second subframe;

wherein the base station further comprises a first notification module, configured to send a notification message to a corresponding first user equipment, after configuring, by the adjacent base station, the operating mode of the second subframe, if the operating mode of the first subframe is subjected to collision with the operating mode of the second subframe, wherein the notification message is to instruct the first user equipment to stop an uplink HARQ process corresponding to the first subframe, and instruct the first user equipment to send an unsuccessfully transmitted data packet in a buffer to the base station using an uplink HARQ process corresponding to another subframe of the base station, and notify the configuring module to reconfigure the first subframe.

13. The base station according to claim 12, wherein the configuring module is adapted to:
configure the operating mode of the first subframe as a downlink transmission mode, if the base station needs a subframe in a downlink transmission mode, and when the operating mode of the second subframe is an uplink transmission mode, and the base station acquires that the adjacent base station can switch the operating mode of the second subframe to an approximately blank mode or a blank mode after detecting that the operating mode of the first subframe is a downlink transmission mode; or
configure the operating mode of the first subframe as an approximately blank mode or a blank mode, if the base station needs a subframe in a downlink transmission mode, and when the operating mode of the second subframe is an uplink transmission mode.

14. The base station according to claim 12, wherein the base station further comprises an acquiring module, configured to acquire the operating mode of the second subframe; the configuring module is specifically adapted to configure the operating mode of the first subframe according to the operating mode of the second subframe acquired by the acquiring module.

15. The base station according to claim 14, wherein the acquiring module is configured to
acquire the operating mode of the second subframe according to operating mode information of the adjacent base station sent by a corresponding first user equipment; or
acquire the operating mode of the second subframe according to operating mode information sent by the adjacent base station; or
acquire the operating mode of the second subframe according to a reference signal on the second subframe.

16. The base station according to claim 12, wherein the determining module is configured to:
select a subframe with the highest priority among configurable subframes as the first subframe to be configured according to the priority information of the subframes, if a subframe in an uplink transmission mode is needed; or
select a subframe with the lowest priority among configurable subframes as the first subframe to be configured according to the priority information of the subframes, if a subframe in a downlink transmission mode is needed.

* * * * *